United States Patent [19]
Narita

[11] Patent Number: 5,729,061
[45] Date of Patent: Mar. 17, 1998

[54] OVER DISCHARGE PROTECTION CIRCUIT FOR A RECHARGEABLE BATTERY

[75] Inventor: Izuru Narita, Sagamihara, Japan

[73] Assignee: International Business Machines Corporation, Armonk, N.Y.

[21] Appl. No.: 656,512

[22] Filed: May 31, 1996

[30] Foreign Application Priority Data

Jun. 2, 1995 [JP] Japan ................................. 7-137042

[51] Int. Cl.⁶ ............................................ H01H 83/12
[52] U.S. Cl. ..................... 307/130; 307/116; 307/125; 364/483; 320/2; 320/13; 361/88; 361/90; 361/92
[58] Field of Search ........................... 307/130, 125, 307/116; 320/2, 43, 13; 364/492, 273-273.5, 483; 323/271; 361/90, 92, 88

[56] References Cited

U.S. PATENT DOCUMENTS

| | | | |
|---|---|---|---|
| 5,049,805 | 9/1991 | Celenza et al. | 323/285 |
| 5,191,291 | 3/1993 | Taylor | 324/429 |
| 5,345,392 | 9/1994 | Mito et al. | 364/483 |
| 5,442,794 | 8/1995 | Wisor et al. | 395/750 |
| 5,477,124 | 12/1995 | Tamai | 320/13 |
| 5,483,165 | 1/1996 | Cameron et al. | 324/427 |

*Primary Examiner*—William M. Shoop, Jr.
*Assistant Examiner*—Albert W. Paladini
*Attorney, Agent, or Firm*—Calfee, Halter, Griswold; Daniel E. McConnell

[57] ABSTRACT

An over discharge protection circuit for a rechargeable battery which prevents an over discharge of the battery in response to a current operating condition, even though the operational state of an electric/electronic apparatus is changed for the purpose of saving the power consumption. The over discharge protection circuit comprises a selector selecting a threshold voltage in response to the operating condition of the electric/electronic apparatus; a comparitor comparing the output terminal voltage of said battery with the threshold voltage selected by the selector; a switch opening or closing a power feed line along which the battery is powered; and a controller controlling the switch in response to the comparison result by the comparitor.

24 Claims, 5 Drawing Sheets

5,729,061

OVER DISCHARGE PROTECTION CIRCUIT FOR A RECHARGEABLE BATTERY

BACKGROUND OF THE INVENTION

The present invention relates to an over discharge protection circuit for a rechargeable battery that can prevent the degrading of a characteristic due to an over discharge of the battery; and in particular to an over discharge protection circuit for a rechargeable battery that can be applied for a battery-operated electric/electronic apparatus such as a portable computer. More specifically, the present invention pertains to an over discharge protection circuit for a rechargeable battery that can appropriately prevent an over discharge of a battery in response to a current operating condition, even though the operating condition of an electric/electronic apparatus (i.e., the power consumption of the apparatus) changes for the purpose of power saving.

Electric/electronic devices that are designed and produced today tend to be compact and light, with portability and outdoor use being two of the primary considerations in their designs. So-called notebook type personal computers (hereafter referred to simply as "PCs" or "systems") are good examples.

One of the features of such portable electric/electronic devices is that they are "battery operated," so that they can be operated, with the power being supplied by incorporated batteries, at sites where there are no commercially available power sources. The incorporated batteries are ordinarily in the form of "battery packs," wherein are packaged a plurality of battery cells in order to supply sufficient power for the devices. In view of recycling, rechargeable battery cells such as NiCd, NiMH, or Li-Ion are employed.

One problem with rechargeable batteries is that when an output voltage value falls below a certain value, they reverse polarity (a so-called over discharged state). Once they reverse polarity, their charging and discharging characteristics are deteriorated, and they cannot be fully charged any more after that. Some battery-operated electric/electronic devices, therefore, have an over discharge protection circuit to prevent the degradation of battery characteristics due to over discharging. For example, the ThinkPad Models 700/750/755 ("ThinkPad" is a trademark of IBM Corp.), that are sold by IBM Japan, Ltd., have an over discharge protection circuit for their incorporated battery packs.

SUMMARY OF THE INVENTION

It is therefore one purpose of the present invention to provide an excellent over discharge protection circuit, for a rechargeable battery, that can prevent the degrading of a characteristic due to an over discharge of the battery.

It is another purpose of the present invention to provide an over discharge protection circuit, for a rechargeable battery, that can be applied for a battery-operated electric/electronic apparatus, such as a portable computer.

It is an additional purpose of the present invention to provide an over discharge protection circuit, for a rechargeable battery, that can appropriately prevent an over discharge of the battery in response to a current operating condition, even though the operational state of an electric/electronic apparatus is changed for the purpose of saving the power consumption.

BRIEF DESCRIPTION OF THE DRAWINGS

Some of the purposes of the invention having been stated, others will appear as the following description proceeds, when taken in connection with the accompanying drawings, in which.

DESCRIPTION OF THE PREFERRED EMBODIMENT(S)

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 5:
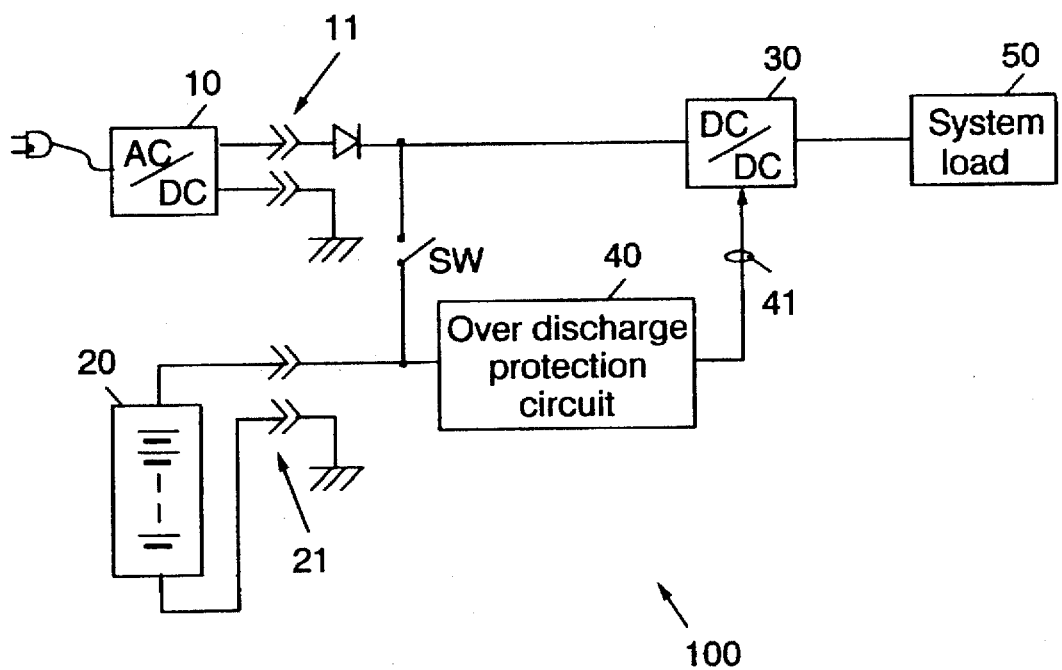
FIG. 5 is a specific diagram illustrating a prior art power supply system (background) for an electric/electronic apparatus 100 that includes an over discharge protection circuit.
Figure 6:
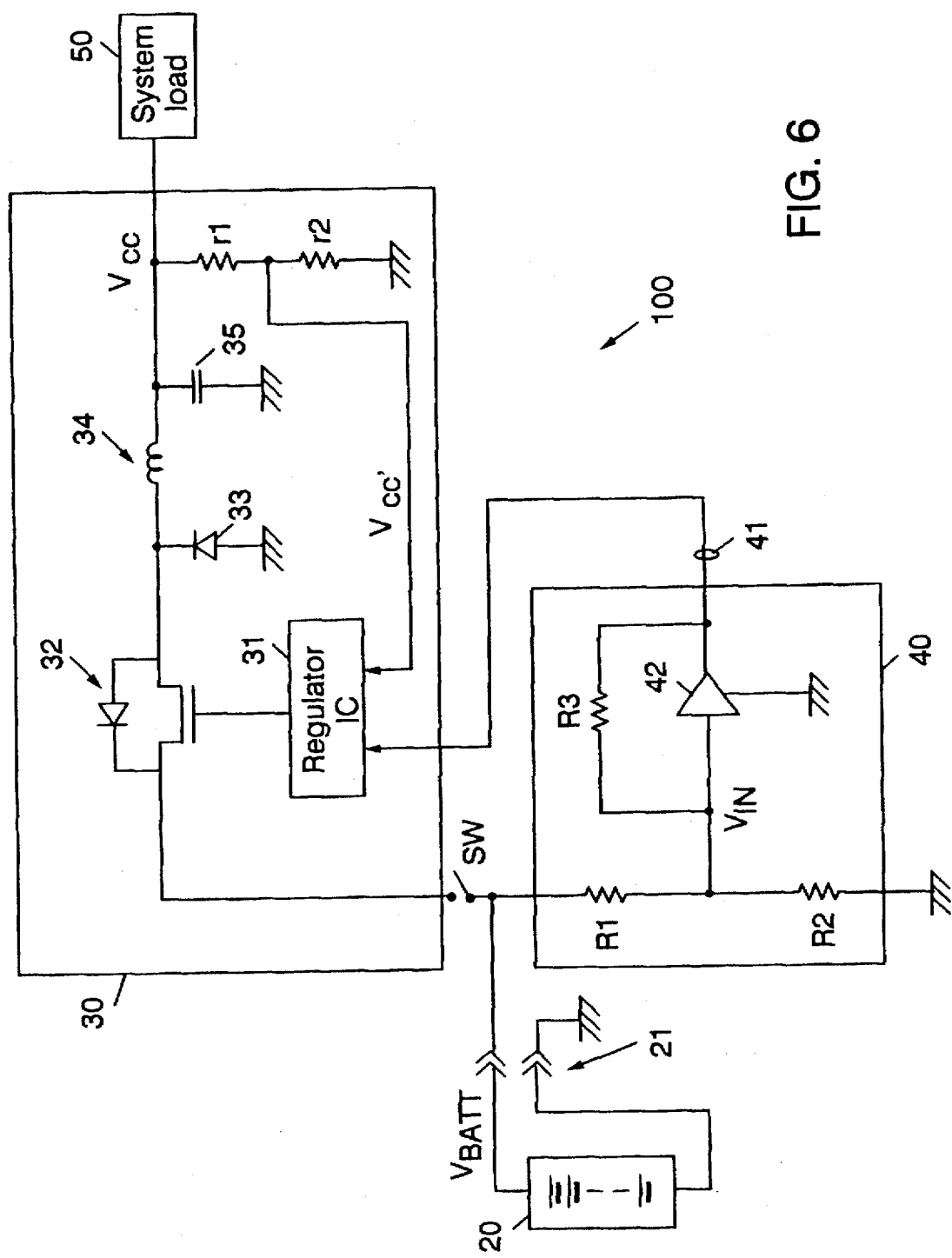
FIG. 6 is a detailed diagram illustrating the over discharge circuit 40 and its peripheral portion in the power supply system shown in FIG. 5.

A conventional power supply system of an electric/electronic device that has a prior art over discharge protection circuit is shown in FIGS. 5 and 6. As is shown in FIG. 5, an electric/electronic device 100 can be powered by both a commercially available power source and a battery pack 20. A DC/DC converter receives both the powers in parallel. Since the power obtained from a commercially available power source will usually be an alternating current voltage, it must therefore be converted into a direct current voltage by an AC/DC adaptor 10 before being used. The AC/DC adaptor 10 and the battery pack 20 are detachably connected to the electric/electronic device 100 by connectors 11 and 21. The DC/DC converter 30 reduces the output voltage of the AC/DC adaptor 10 (generally about 20 V), or output terminal voltage $V_{BATT}$ of the battery pack 20 (generally about 10 V) to a voltage level that is appropriate for use in the electric/electronic device 100 (e.g., 5 V or 3.3 V), and then supplies the adapted voltage as a power supply voltage $V_{CC}$ to a system load 50. If the electric/electronic device 100 is a PC, the system load 50 is, for example, an MPU (Micro Processing Unit), a main memory, various peripheral controllers, a hard disk drive (HDD), or a floppy disk drive (FDD). An over discharge protection circuit 40 is connected in parallel to the output terminal of the battery pack 20. During the course of the system operation, the output terminal voltage $V_{BATT}$ is always monitored. When the terminal voltage $V_{BATT}$ falls below a predetermined value (more specifically, a voltage level that is immediately before the level at which the battery will cause the polarity reversal due to over discharging), a control signal 41 is outputted to the DC/DC converter 30. The DC/DC converter 30, in response to the control signal, opens or closes a power feed line that runs between the output terminal of the battery pack 20 and the electric/electronic device 100.

In the thus arranged power supply system, when the output terminal voltage $V_{BATT}$ of the battery pack 20 falls below a predetermined value, the output terminal of the battery pack 20 can be forcibly disconnected, regardless of the ON/OFF state of a power switch (not shown) of the device 100. By disconnecting the output terminal of the battery pack 20 from the load 50, the remaining battery power does not flow out so that the over discharging (and polarity reversal) can be prevented. When the output terminal voltage $V_{BATT}$ falls below a predetermined value, the output terminal of the battery pack 20 will not be connected to the system load 50, even though the power switch is physically turned on.

FIG. 6 is a detailed diagram illustrating the over discharge protection circuit 40 and its peripheral portion in the power supply system shown in FIG. 5. The over discharge protection circuit 40, which is connected in parallel to the output terminal of the battery pack 20, detects whether or not the output terminal voltage $V_{BATT}$ of the battery pack 20 falls below a voltage level that lies immediately before the level at which the battery is over discharged and causes the polarity reversal (hereafter, such voltage level is referred to as a "threshold voltage value $V_{TH}$"). Divided voltage resistors $R_1$ and $R_2$ reduce the output terminal voltage $V_{BATT}$ by $R_2/(R_1+R_2)$, and transmit the resultant voltage to the input terminal of a voltage detector 42. When the input voltage $V_{IN}$ is greater than 5 V, the voltage detector 42 activates an output signal 41 (provides an OPEN output). When the input voltage $V_{IN}$ is less than 5 V, the voltage detector 42 inactivates the output (provides a GND output). It would be easily understood that the threshold voltage value $V_{TH}$ of the over discharge protection circuit 40 can be adjusted by properly setting the divided voltage resistors $R_1$ and $R_2$. When, for example, the battery cells are NiCd or NiMH, the over discharge voltage for each cell is approximately 1.0 V. When a battery pack is employed that comprises a series connection of seven of these cells, a resistance ratio of the divided voltage resistors $R_1$ and $R_2$ can be so set that the threshold voltage value $V_{TH}$ is 7.0 V.

Further, in FIG. 6, the DC/DC converter 30, which is connected to the output terminal of the battery pack 20, drops its voltage $V_{BATT}$ (normally about 10 V) to a lower voltage level (5 V or 3.3 V) that is appropriate for driving the system, and outputs the resultant voltage as a power supply voltage $V_{CC}$. A regulator IC 31 returns the power supply voltage $V_{CC}$, which is obtained across the divided voltage resistors $r_1$ and $r_2$, and opens or closes an FET switch 32 in response to the result of a comparison between the voltage $V_{CC}$ and a predetermined reference voltage, so as to keep the power supply voltage $V_{CC}$ at a constant level. A diode 33, a coil 34 and a capacitor 35 constitute a so-called smoothing circuit. The coil 34 is employed to supply an electric current by induction even after the FET switch 32 is cut off. The diode 33, whose anode is grounded, receives electric charges from the ground that are in consonance with the inductive action of the coil 34. The capacitor 35 stores the charges temporarily, and discharges them in consonance with the change in the load 50. The regulator IC 31 in this example also receives the control signal 41 from the over discharge protection circuit 40. While the output terminal voltage $V_{BATT}$ is less than the threshold voltage value $V_{TH}$, the regulator IC 31 keeps the FET switch 32 off and severs the power feed line from the battery pack 20 to the system load 50.

Most conventional over discharge protection circuits (including the one shown in FIG. 6) detect the over discharged state of a battery pack by comparing the output terminal voltage $V_{BATT}$ of the battery pack only with the fixed threshold voltage value $V_{TH}$. This seems to be based on the supposition that the output terminal voltage $V_{BATT}$ of the battery pack depends only on the remaining capacity of the battery. Actually, however, in addition to the battery remaining capacity, the operating condition of the system load 50 greatly affects a change in the output terminal voltage $V_{BATT}$. The output terminal voltage $V_{BATT}$ becomes relatively high, when the operating condition is low (e.g., in the power-off state or in a low power consumption state). To the contrary, when the operating condition is high (e.g., I/O devices, such as HDD or FDD, that may consume relatively high power is operated), the output terminal voltage $V_{BATT}$ becomes relatively low (actually, the voltage is dropped by about 1 V when the HDD is accessed) even if the remaining capacity of a battery is the same. If the threshold voltage value $V_{TH}$ is determined to be relatively high level on the assumption that the system load is in the low operating condition, the supply of power may be suddenly halted by the over discharge protection circuit then when the system load is drastically increased by, for example, the HDD suddenly being accessed. To the contrary, if the threshold voltage value $V_{TH}$ is determined to be relatively low level on the assumption that the system load is in the high operating condition, this sudden halting of the power supply can be prevented. In the latter case, however, it is anticipated that a low system load state (i.e., a weak discharge current) will continue for a long time. And though the output terminal voltage $V_{BATT}$ is the same, as a battery tends to be susceptible to over discharging when a weak current is continuously discharged over an extended period of time (well known), the characteristics of the battery will be degraded.

Especially since recent PCs have a variety of different system operational modes to provide for a low power consumption (Power Management), the acquisition of the time for driving the over discharge protection circuits has become more difficult. ThinkPad Models 750/755 that are sold by IBM Japan, Ltd., for example, have low power consumption operational modes, such as "Suspend" and "Hibernation." The suspend mode is the mode in which the power supply to all the electric circuits, except to the main memory, is halted after the data (hardware context information, such as the register values of an I/O device or the status of a CPU, and the contents of a VRAM) that are required for the resumption of a task are saved in a main memory. The hibernation mode is a mode in which the power supply to all the electric circuits, including the main memory is halted after the above described hardware context information, the contents of the VRAM, and data in the main memory are saved to an HDD. As is well known, the power consumption in the hibernation mode is lower than in the suspend mode (i.e., the system sleeps more deeply in the hibernation mode). By monitoring the power feed state at the battery pack and the activity of the I/O device, the system enters the suspend mode and then enters the hibernation mode (i.e., the operating mode is shifted by steps to a deeper system sleep mode).

The normal operational mode is a high system-load condition wherein power is supplied to I/O devices, such as an HDD and an FDD, that have a relatively high power consumption. The suspend mode and the hibernation mode are low power system-load conditions wherein the power supply is halted to almost all the electric circuits. To shift from the suspend mode to the hibernation mode, however, the HDD must be accessed to save those data required for the resumption of a task. In other words, the operation during the course of switching to the two low power consumption modes is a high system-load operational condition. If the threshold voltage value $V_{TH}$ is determined to a large value while the suspend mode is shifted to the hibernation mode, the over discharge protection circuit will be activated and the supply of power will suddenly be cut off. For the previously mentioned ThinkPad Models 750/755, the threshold voltage value $V_{TH}$ is set low to eliminate the possibility of such a sudden halting of the supply of power. However, in this case, an over discharge of a battery may be caused by a constant, small current discharge that continues for an extended period of time.

In other words, in an electric/electronic apparatus whose system load fluctuates greatly, the incorporation of an over discharge protection circuit for a battery will provide insufficient protection for a battery. In such an electric/electronic apparatus, the time for the activation of the over discharge protection circuit must be appropriately determined, otherwise the supply of power will be suddenly halted, or the characteristic of a battery will be degraded.

In order to achieve the purposes of this invention as stated above, according to a first aspect of the present invention, an over discharge protection circuit for a battery which is applied to a battery-operated electric/electronic apparatus comprises selection means for selecting a threshold voltage in response to the operating condition of said electric/electronic apparatus; comparison means for comparing output terminal voltage of said battery with the threshold voltage selected by said selection means; opening/closing means for opening or closing a power feed line along which said battery is powered; and control means for controlling said opening/closing means in response to the comparison result by said comparison means.

According to a second aspect of the present invention, an over discharge protection circuit for a battery which is used for a battery-operated personal computer to prevent an over discharge of said battery comprises selection means for selecting a threshold voltage in response to the operating condition of said personal computer; comparison means for comparing output terminal voltage of said battery with the threshold voltage selected by said selection means; opening/closing means for opening and closing a power feed line along which said battery is powered; and control means for controlling said opening/closing means in response to the comparison result by said comparison means.

In an over discharge protection circuit according to the second aspect of the present invention, the selection means selects a relatively low threshold voltage while power consumption by the personal computer is high, and selects a relatively high threshold voltage while the power consumption is low.

According to a third aspect of the present invention, an over discharge protection circuit which is used in a battery-operated personal computer having a hard disk drive and which prevents an over discharge of a battery comprises selection means for selecting a threshold voltage in response to on whether or not power is supplied to said hard disk drive; comparison means for comparing an output terminal voltage of said battery with the threshold voltage selected by said selection means; opening/closing means for opening and closing a power feed line along which said battery is powered; and control means for controlling said opening/closing means in response to the comparison result by said comparison means.

In an over discharge protection circuit according to the third aspect of the present invention, the selection means selects a relatively low threshold voltage while power is supplied to the hard disk drive, and selects a relatively high threshold voltage while power is not supplied to the hard disk drive.

The over discharge protection circuit according to the present invention is appropriately driven in response to changes in the operational condition of an electric/electronic apparatus. Therefore, by the provision of an over discharge protection circuit of the present invention, a battery-operated electric/electronic apparatus, such as a notebook computer, can prevent an over discharge of a battery without causing the power supply to be suddenly halted. Even for an electric/electronic apparatus that has two or more operational modes for which the power consumption requirements differ, an over discharge protection circuit of the present invention is appropriately driven.

Figure 1:
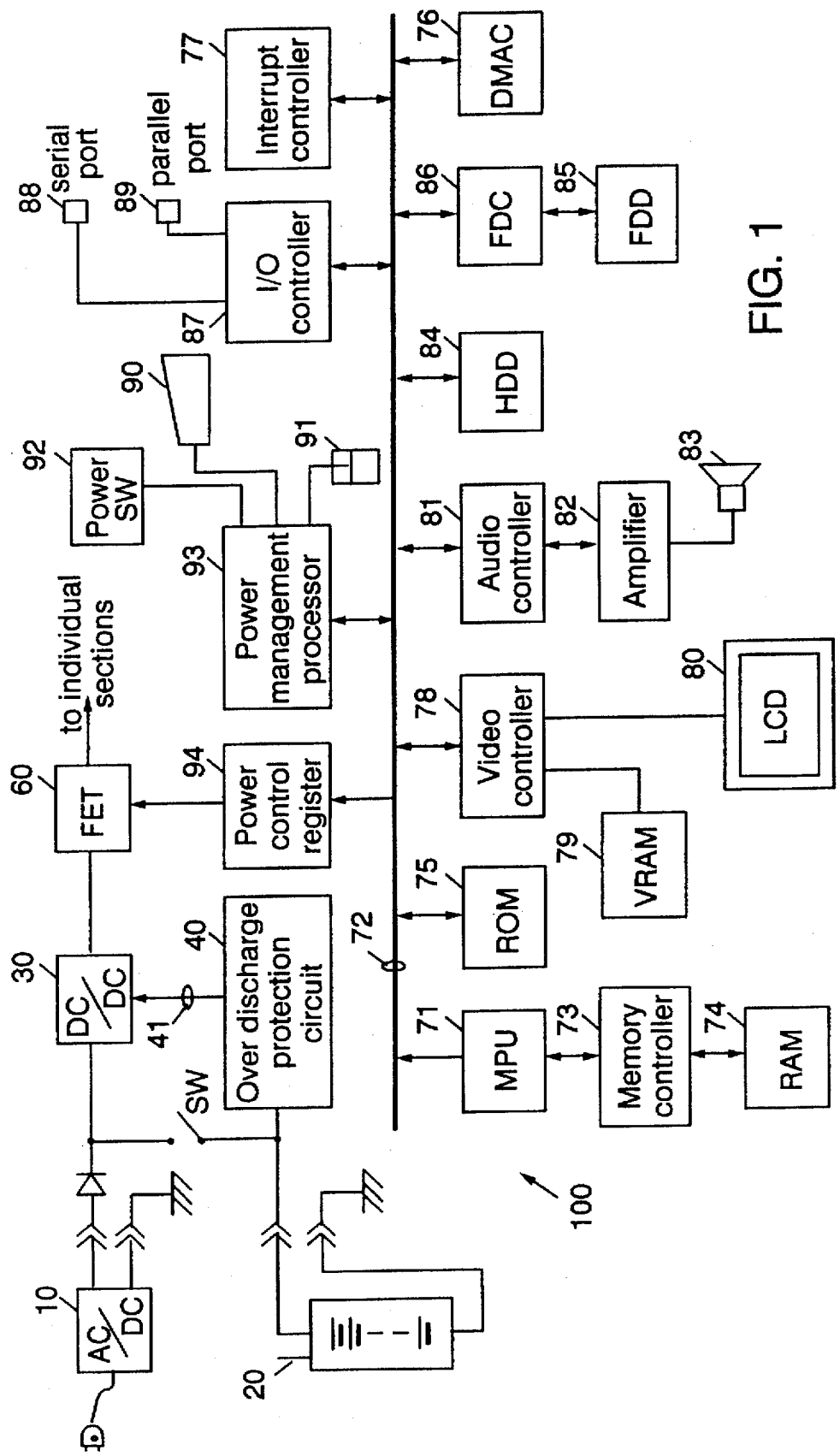
FIG. 1 is a block diagram illustrating the hardware structure for a personal computer that embodies the present invention, mainly from the view of data flow.

FIG. 1 is a block diagram illustrating the hardware structure of a personal computer (PC) 100 that embodies the present invention, with a view mainly to data flow.

In the PC 100, an MPU (Micro Processing Unit) 71, which is a main controller, executes various application programs under the control of an operating system (OS). The MPU 71 communicates with the individual sections via a common signal transfer path (also called a "bus") that consists of data signal lines, address signal lines and control signal lines.

A main memory 74 is a volatile memory (RAM), into which various programs, such as OS and application programs, are loaded, or which is employed as a work area for the MPU 71. A dynamic RAM (DRAM), for which a relatively large memory capacity is available at a low price, is used for the main memory 74. A memory controller 73 controls the access of the main memory 74. A ROM 75 is a nonvolatile memory, for which the written data are determined during the manufacturing process, that is employed to semi-permanently store a testing program (POST) which is executed at the time of activation of a system, and a coded program (BIOS) for controlling the individual system hardware components.

A DMA controller 76 is a dedicated processor for controlling the data transferring operation between the main memory 74 and the I/O device without the involvement of the MPU 71. An interrupt controller 77 constantly monitors the bus 72, and upon the detection of the occurrence of an interrupt (a system interrupt), it reports that effect to the MPU 71 (actually to the BIOS).

A video controller 78, which is a processor that actually processes a drawing command from the MPU 71, temporarily writes processed drawing information in a screen buffer (VRAM) 79, and reads drawing information from the VRAM 79 and outputs it to the display device (e.g., a liquid crystal display device (LCD)) 80. An audio controller 81 is a processor for the input and the output of audio signals. An audio signal that is outputted by the audio controller 81 is amplified by, for example, an amplifier 82, and the amplified signal is then outputted through a loudspeaker 83.

A hard disk drive (HDD) 84 and a floppy disk drive (FDD) 85 are so-called auxiliary storage devices. A floppy disk controller (FDC) 86 is a controller for driving an FDD 85.

An I/O controller 87 controls the data input/output that is performed with external devices (a modem, a printer, etc.) via a serial port 88 and a parallel port 89. A keyboard 90 is used for key input, a mouse (or a TrackPoint (trademark of IBM Corp.)) 91 is used to enter coordinate values, and a power switch 92 is employed to indicate the start and the stop of the power supply to the entire system 100.

A power management processor 93 is a peripheral controllers to enable the low power consumption (Power Management) operation of the system 100. The power management processor 93 can control the power supply, and the halting of the power supply to the individual hardware components, by opening or closing an FET switch 60 in response to the ON and OFF state of the bit cell in a power control register 94. The power management processor 93 monitors the data that are inputted at the keyboard 90 or by means of the mouse 91, and the remaining capacity of a battery 20. When the power management processor 93 detects the occurrence of a specific phenomenon that indicates the system 100 should enter the low power consumption mode, it sends an interrupt request to the bus 72. The specific phenomenon mentioned is that "(a) predetermined period of time has elapsed since the last input operation by an operator", "the remaining capacity of a battery has fallen below a predetermined value", or "key input to indicate the request for the mode transition has been made".

An over discharge protection circuit 40, one of hardware components that are closely related to the subject of the present invention, prevents in advance the over discharging of the battery pack 20 and its polarity reversal. While the previously described hardware blocks are jointly operated via the bus 72, the over discharge protection circuit 40 is operated independent of the data flow on the bus 72.

Almost all the currently available PCs comprise components that are the equivalent of the hardware blocks 71 through 92. Since it is well known to one having ordinary skill in the art that the PC includes many other hardware components, to simplify the explanation these components are not shown. The power management processor 93 and the power control register 94 are also already known. Hardware blocks that are the equivalent to those numbered 93 and 94 are described in, for example, the specifications for U.S. Pat. Nos. 5,230,074 and 5,345,392 and Japanese Patent 2,029,739, all of which are assigned to the assignee of the present subject invention. ThinkPad Models 700C/750/755, that are sold by IBM Japan, Ltd., comprise hardware components that are the equivalent of those numbered 93 and 94.

The system 100 with the above described hardware arrangement can execute low power operation, such as a suspend mode and a hibernation mode. The operation for entering these modes will now be briefly described. When the MPU 71 (more specifically, the BIOS) receives from the interrupt controller 77 a notice that an interrupt has occurred, the MPU 71 recognizes that the source of the interrupt request is the power management processor 93. When the occurring event means the request for entering the suspend mode, the MPU 71 (more specifically, a program for low power consumption; hereafter referred to as a PMC (Power Management Code)) halts an application that is being executed and writes, in a predetermined area of the main memory 74, the data that are necessary for the resumption of that program. Then, the MPU 71 commands to the power management processor 93 to halt the supply of power to all the electric circuits except for the main memory 74. When the occurring event means the request for entering the hibernation mode, the MPU 71 (more specifically, the PMC) halts an application program that is being executed and saves, on the HDD 84, the data that are required for the resumption of that program. Then, the MPU 71 commands to the power management processor 93 to halt the supply of power to all the electric circuits including the main memory 74. Upon the receipt of a command for the halting of the power supply, the power management processor 93 rewrites the content of the bit cell in the power control register 94, and halts the supply of power to a desired electric circuit.

The system 100 shifts not only from the normal operation mode directly to the hibernation mode, but it also shifts by steps via the suspend mode. In the latter case, though the HDD 84 is being powered down during the suspend mode, the power supply to the HDD 84 is restarted for the purpose of saving the necessary data into it. As a result, the load (consumed power) on the system 100 is drastically increased, and accordingly, the output terminal voltage $V_{BATT}$ of the battery pack 20 temporarily falls sharply.

Figure 2:
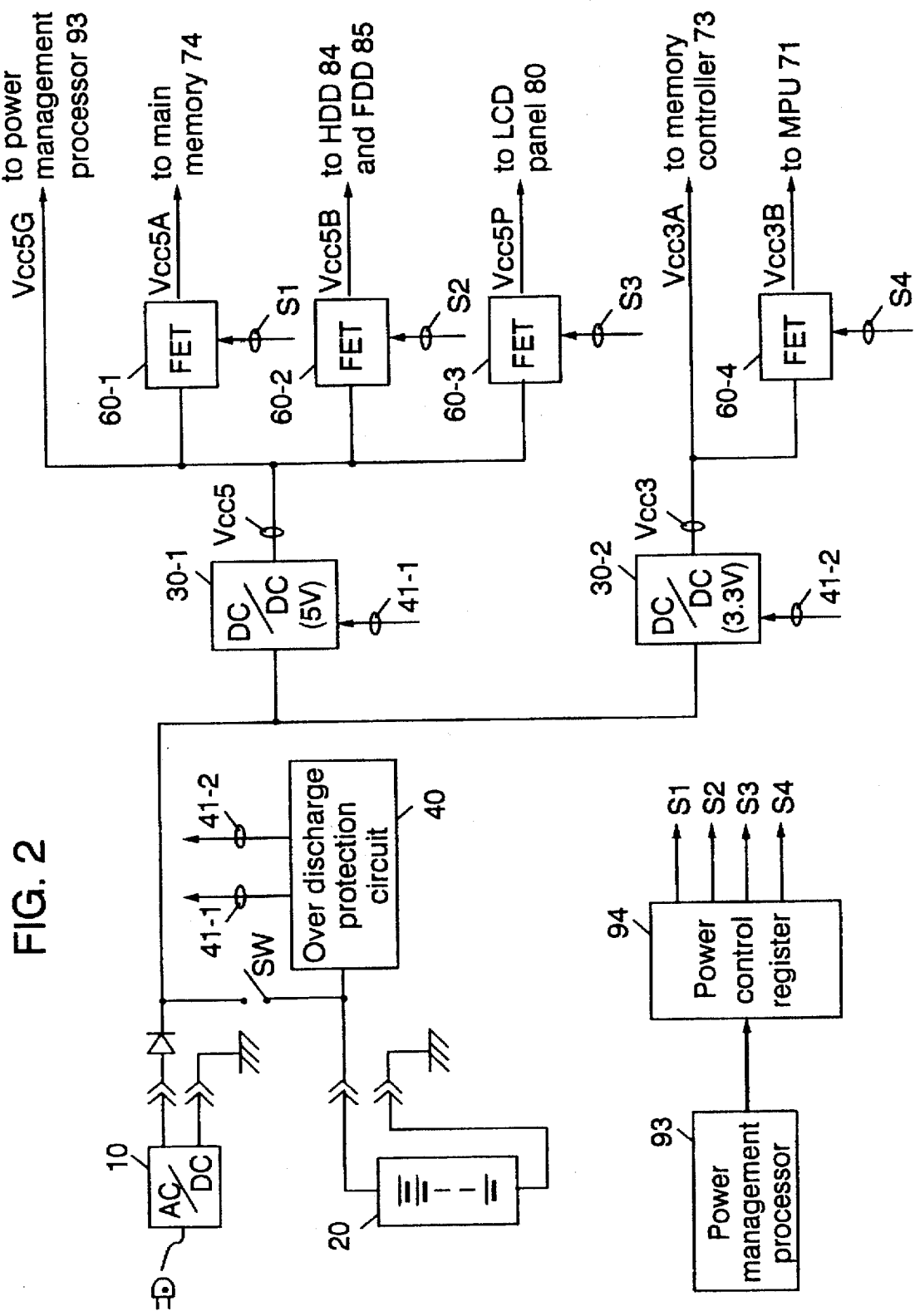
FIG. 2 is a specific diagram illustrating a power supply system for a personal computer that embodies the present invention.

FIG. 2 is a specific diagram illustrating the power supply system of the personal computer 100 that can implement the present invention.

Power lines of the battery pack 20 and the AC/DC adaptor 10 are connected to a DC/DC converter 30-1 that has an output voltage of 5 V, and to a DC/DC converter 30-2 that has an output voltage of 3.3 V. Though the DC/DC converters are denoted by a single block 30 in FIG. 1, actually there are two blocks, 30-1 and 30-2, to handle the differences in the drive voltages of the electric circuits.

The power line $V_{CC5}$ from the DC/DC converter 30-1 branches to four sub-power lines $V_{CC5G}$, $V_{CC5A}$, $V_{CC5B}$ and $V_{CC5P}$. The power line $V_{CC5G}$ is employed to supply power to the power management processor 93; $V_{CC5A}$ is employed for the main memory 74; $V_{CC5B}$ is employed for the I/O devices, such as the HDD 84 and the FDD 85; and $V_{CC5P}$ is employed for the LCD panel 80. FET switches 60-1, 60-2 and 60-3 are inserted across the power lines $V_{CC5A}$, $V_{CC5B}$ and $V_{CC5P}$ to connect/disconnect them.

The power line $V_{CC3}$ from the DC/DC converter 30-2 branches to two sub-power lines $V_{CC3A}$ and $V_{CC3B}$. The sub-power line $V_{CC3A}$ is employed to supply power to the memory controller 73, and $V_{CC3B}$ is employed for the MPU 71. An FET switch 60-4 is inserted across the sub-power line $V_{CC3B}$ to connect and disconnect it.

The FET switches 60-1 and 60-2 etc. are inserted across the sub-power lines of the respective power lines $V_{CC5}$ and $V_{CC3}$ of the DC/DC converters 30-1 and 30-2, because the power supply can be started and stopped by each sub-power line. The gate terminals of the FET switches 60-1 and 60-2 etc. are electrically connected to the corresponding bit cells of the power control register 94. The power management processor 93 can control the power supply to each sub-power line by writing or erasing the corresponding bit cells of the power control register 94.

The over discharge protection circuit 40 is connected in parallel to the output terminal of the battery pack 20, and monitors the terminal voltage $V_{BATT}$ so as to detect, in response to the operating condition of the system 100, the time immediately before the battery pack 20 enters the over discharged condition (causes polarity reversal). The over discharge protection circuit 40 transmits control signals 41-1 and 41-2 to the DC/DC converters 30-1 and 30-2, respectively, and cuts off the power feed line from the battery pack 20 by a mechanism that is described in the "Description of the Background" while referring to FIG. 6. Sub-divisions C and D should be referred to for the detailed structure and the operational characteristic of the over discharge protection circuit 40.

As is described herein, the MPU 71 (actually, the PMC) issues a suspend request and a hibernation request to the power management processor 93. Upon the receipt of these request, the power management processor 93 alters the contents of the bit cells of the power control register 94 and achieves a desired power supplying state. Table 1 shows the condition of the supply of power across the sub-power lines $V_{CC3B}$ (to the MPU 71), $V_{VCC5A}$ (to the main memory 74), and $V_{CC5B}$ (to the HDD 84) in the individual operating modes: normal operation, suspend, suspend→hibernation, and hibernation.

TABLE 1

| Volts\Mode | Normal | Suspend | Suspend → Hibernation | Hibernation | Off |
|---|---|---|---|---|---|
| $V_{CC3B}$ | On | Off | On | Off | Off |
| $V_{CC5A}$ | On | On | On | Off | Off |
| $V_{CC5B}$ | On | Off | On | Off | Off |

In the normal operation mode, power is supplied to almost all the electric circuits and the power consumed by the entire system 100 is high. On the other hand, in the suspend and the hibernation modes, the power supply to most of the electric circuits is halted and the consumed power in the entire system 100 is low. When the mode is shifted from the suspend mode to the hibernation mode, supply of power across the sub-power line $V_{CC5B}$ is temporarily started because the necessary data must be saved on the HDD 84. As is well known by one having ordinary skill in the art, a relatively large power supply is required to drive and to access the HDD. During the operation for shifting between the two low power consumption modes, the load on the system 100 is suddenly increased. When power is supplied from the battery pack 20 whose power capacity is limited, the terminal voltage $V_{BATT}$ of the battery is drastically reduced in consonance with the increase in the system load 50.

Figure 3:
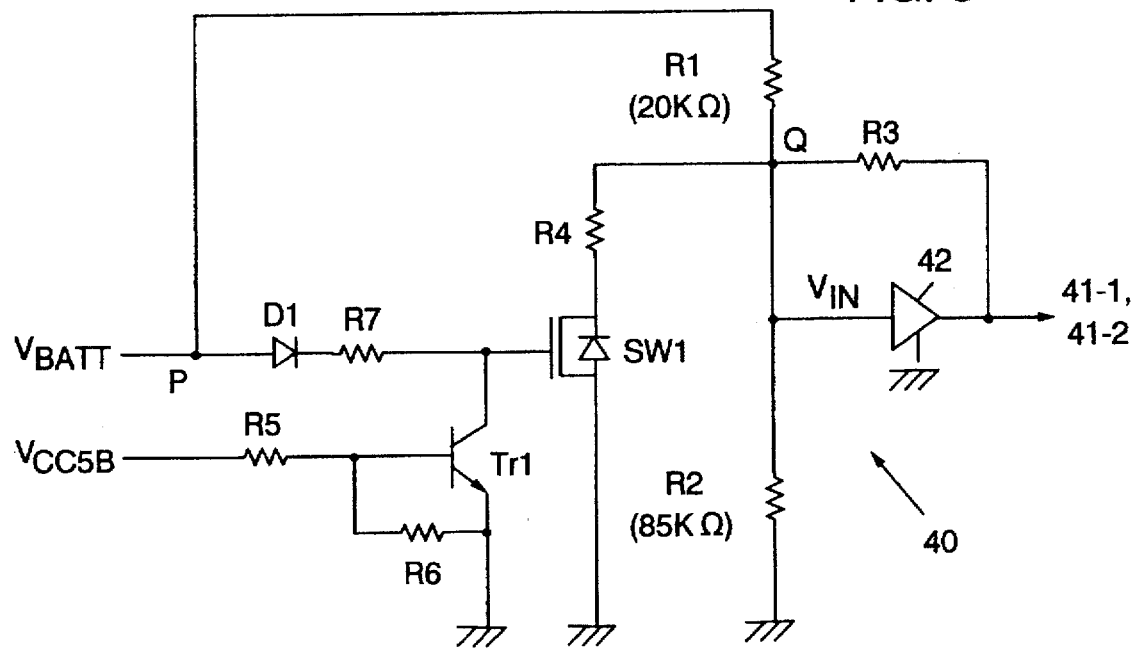
FIG. 3 is a detailed diagram illustrating an over discharge protection circuit 40.

FIG. 3 is a detailed diagram illustrating the over discharge protection circuit 40.

The over discharge protection circuit 40 receives the output terminal $V_{BATT}$ from the battery pack 20, and also receives the power across the sub-power line $V_{CC5B}$. The reason why the over discharge protection circuit 40 is connected to the sub-power line $V_{CC5B}$ is that the line $V_{CC5B}$ is employed to supply power to the HDD 84, and that the operating condition of the system 100 can be appropriately identified by monitoring the voltage level across the sub-power line $V_{CC5B}$.

The current carried by output terminal $V_{BATT}$ is branched at a point P. One current-branch travels across a resistor R1 and is inserted at a point Q. The other branch is carried across a diode D1 that protects from the backflow, and across a resistor R7 that protects from over current, to the gate of an n-channel MOS FET switch SW1. The voltage on the sub-power line $V_{CC5B}$ is carried across a resistor R5 and divided, with one voltage division being sent to the base of an npn transistor Tr1 and the other voltage division being carried across a resistor R6 and grounded. The emitter of the transistor Tr1 is grounded and the collector is OR-input to the gate of the FET switch SW1. The source of the FET switch SW1 is grounded and a resistor R4 is inserted between its drain and point Q. The voltage at point Q is divided by the resistor R2 and the divided voltage is inputted to a voltage detector 42. The voltage detector 42, as well as that which is described in "Description of the Background" while referring to FIG. 6, activates the output when the input voltage $V_{IN}$ is 5 V or higher, and inactivates the output when the input voltage $V_{IN}$ is lower than 5 V. A hysteresis resistor R3 is employed for the voltage detector 42. The voltage at the output terminal of the voltage detector 42 is supplied as control signals 41-1 and 41-2 to the respective DC/DC converters 30-1 and 30-2 to open or close the power feed line from the battery pack 20.

The over discharge protection circuit 40 is connected in parallel to the output terminal of the battery pack 20. It detects the time just before the battery pack 20 will enter the over discharged state (polarity reversal) by comparing the output terminal voltage $V_{BATT}$ with a threshold voltage. Further, the over discharge protection circuit 40 in this embodiment determines the operating condition of the system 100 by monitoring the voltage across the sub-power line $V_{CC5B}$, and dynamically adjusts its own threshold voltage in response to the result.

First, an explanation will be given for the operational characteristic of the over discharge protection circuit 40 when the system 100 is in the normal mode, or during the course of entering the hibernation mode. Since, as is shown in Table 1, $V_{CC5B}$ is being in the ON state, the transistor Tr1 is activated. Accordingly, the gate of the FET switch SW1 is grounded, and the FET switch SW1 is turned off.

Figure 4A:
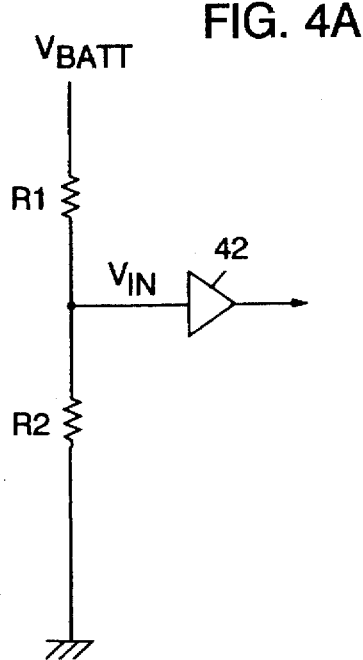
FIGS. 4a and 4b are diagrams for explaining the operational characteristic of the over discharge protection circuit 40, with FIG. 4(a) more specifically showing an equivalent circuit for a system 100 when the system 100 is in a normal operational mode or during the course of entering a hibernation mode, and with FIG. 4(b) showing an equivalent circuit for the system 100 when it is in the suspend mode or in the power-OFF state (including the hibernation mode)

In FIG. 4(a) is shown an equivalent circuit for the over discharge protection circuit 40 while the system 100 is in the normal operation mode or during the course of entering the hibernation mode. Since the output terminal voltage $V_{BATT}$ is divided by the resistors R1 and R2, the voltage $V_{IN}$ of an R2/(R1+R2) multiple is transmitted to the voltage detector 42. Thus, the threshold voltage value $V_{TH1}$ of the over discharge protection circuit 40 is represented by the expression:

$$V_{TH1} = \frac{R_1 + R_2}{R_2} \times 5[V]$$

During the course of entering the hibernation mode, the HDD 84 starts to be powered so that the power consumption by system load becomes high. If the HDD 84 is suddenly accessed while a threshold voltage $V_{TH1}$ is set higher value, the over discharge protection circuit 40 may erroneously sever the power feed line from the battery pack 20. Also, it is known that the battery rarely becomes over discharged state while a discharge the discharging current is larger even though an output voltage is relatively low. Taking these matters into consideration, the threshold voltage value $V_{TH1}$ of the over discharge protection circuit 40 should be low. For example, when the battery pack 20 is constituted by seven NiCd/NiMH battery cells that are connected in series, it is known from experience that $V_{TH1} \approx 6.2$ V is proper. Since R1=20 kΩ and R2=85 kΩ in this embodiment, the threshold voltage value $V_{TH1}$ is set to an optimal value represented by the expression:

$$\frac{20+85}{85} \times 5 = 6.18[V]$$

An explanation will now be given for the operational characteristic of the over discharge protection circuit 40 when the system 100 is in the suspend mode, or when the power is off (including the hibernation mode). As is shown in Table 1, when the $V_{CC5B}$ is in the OFF state, the transistor Tr1 is not activated. Accordingly, the terminal voltage $V_{BATT}$ is applied to the gate of the FET switch SW1, which is then turned on.

Figure 4B:
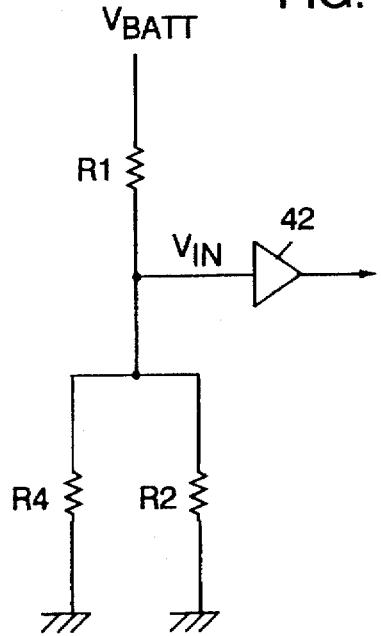

In FIG. 4(b) is shown an equivalent circuit of the over discharge protection circuit 40 when the system 100 is in the suspend mode or when the power is off (including the hibernation mode). Since the output terminal voltage $V_{BATT}$ is divided by the resistors R1 and R2' (R2' is the equivalent of the parallel connected resistors R2 and R4), the voltage $V_{IN}$ of R2'/(R1+R2') times is sent to the voltage detector 42 (1/R2'=1/R2+1/R4). Therefore, the threshold voltage value $V_{TH2}$ of the over discharge protection circuit 40 is as represented by the expression:

$$V_{TH2} = \frac{R_1 + R_2'}{R_2'} \times 5 [V]$$

As is obvious by referring to Table 1, when the system 100 is in the suspend mode or when the power is off (including the hibernation mode), the power consumption by the system load 50 is extremely low. As is mentioned in "Description of the Background", the battery easily becomes the over discharged state when a small discharge current flow continues for an extended period of time. In this case, therefore, the over discharge protection circuit 40 must detect the over discharged state by using the threshold voltage value $V_{TH2}$, which is higher than the voltage $V_{TH1}$. When, for example, the battery pack 20 is constituted by seven NiCd/NiMH battery cells that are connected in series, it is known from experience that $V_{TH2} \approx 7.0$ V is optimal. Since R4=125 kΩ in this embodiment, the threshold voltage value $V_{TH2}$ is set to an optimal value that is represented by the expression:

$$\frac{\frac{1}{\frac{1}{125} + \frac{1}{85}} + 20}{\frac{1}{125} + \frac{1}{85}} = 6.98 [V]$$

The present invention has been described in detail while referring to the specific embodiment. However, it should be obvious to one having ordinary skill in the art that various modifications or revisions of the embodiment are possible within the scope of the present invention. The present invention can be applied for other battery-operated electric/electronic apparatuses: facsimile apparatuses; various types of cordless devices, such as moving wireless terminals, cordless telephones, electronic notebooks and video cameras; word processors; etc. That is, although the present invention has been disclosed by using an example, it should not be limited to that example. To understand the subject of the present invention, the claims should be referred to.

As is described above in detail, according to the present invention, an over discharge protection circuit for a battery can be provided that can appropriately prevent an over discharge of a battery in response to the operational state of an electric/electronic apparatus, even if the operational state is varied in order to save the power consumption. Therefore, with the over discharge protection circuit of the present invention, a battery-operated electric/electronic apparatus, such as a notebook computer, can prevent an over discharge of a battery without causing a sudden halt in the supply of power.

What is claimed is:

1. An over discharge protection circuit comprising:
   a battery selectively powering an electrical apparatus;
   a selector selecting a threshold voltage in response to the operating condition of said electrical apparatus;
   a comparitor comparing the output terminal voltage of said battery with the threshold voltage selected by said selector;
   a switch opening or closing a power feed line along which said battery supplies power; and
   a controller controlling said switch in response to the comparison result by said comparitor.

2. A personal computer comprising:
   a battery selectively powering the personal computer;
   a selector selecting a threshold voltage in response to the operating condition of the personal computer;
   a comparitor comparing the output terminal voltage of said battery with the threshold voltage selected by said selector;
   a switch opening or closing a power feed line along which said battery supplies power; and
   a controller controlling said switch in response to the comparison result by said comparitor.

3. A personal computer according to claim 2 wherein the computer has at least two operating modes in which power consumption differs.

4. A personal computer according to claim 2 wherein said selector selects a relatively low threshold voltage while power consumption from said battery by the personal computer is high, and selects a relatively high threshold voltage while said power consumption is low.

5. A personal computer comprising:
   a battery selectively powering the personal computer;
   a hard disk drive selectively powered by said battery;
   a selector selecting a threshold voltage in response whether or not said hard disk drive is powered from said battery;
   a comparitor comparing the output terminal voltage of said battery with the threshold voltage selected by said selector;
   a switch opening or closing a power feed line along which said battery supplies power; and
   a controller controlling said switch in response to the comparison result by said comparitor.

6. A personal computer according to claim 5, wherein said selector selects a relatively low threshold voltage while power is supplied to said hard disk drive, and selects a relatively high threshold voltage while power is not supplied to said hard disk drive.

7. An over discharge protection circuit, comprising:
   an electronic device;
   at least one battery selectively powering said electronic device and having an output voltage; and
   a control unit that monitors the output voltage of said battery, monitors an operating condition of said electronic device, selects a threshold voltage from between at least two voltages based on the operating condition of said electronic device, and disconnects power from said battery to said electronic device when the output voltage is lower than the threshold voltage.

8. An over discharge protection circuit according to claim 7 wherein said electronic device is a personal computer.

9. An over discharge protection circuit according to claim 7 wherein said battery is a rechargeable NiCd battery.

10. An over discharge protection circuit according to claim 7 wherein said control unit further comprises:
    a switch connecting said battery to said electronic device; and
    a comparator which compares the output voltage to the threshold voltage and generates an output signal which opens said switch when the output voltage is less than the threshold voltage.

11. An over discharge protection circuit according to claim 7 wherein said control unit further comprises a selector which monitors an operating condition of said electronic device and selects a threshold voltage from between at least two possible voltages, said threshold voltage being selected on the basis of the operating condition of said electronic device.

12. An over discharge protection circuit according to claim 11 wherein said selector is in circuit communication with at least one component of said electronic device.

13. An over discharge protection circuit according to claim 12 wherein said at least one component of said electronic device is powered by a power source via a power supply line and wherein said selector is in circuit communication with the power supply line of said component and selects a lower voltage for the threshold voltage when said power source is actively supplying power to said at least one component and a higher voltage for the threshold voltage when said power supply is not actively supplying power to said at least one component.

14. An over discharge protection circuit according to claim 13 wherein said component is a hard drive.

15. An over discharge protection circuit, comprising:

a personal computer;

at least one rechargeable battery selectively powering said personal computer and having an output voltage;

a switch connecting said battery to said personal computer;

a control unit, comprising a selector in circuit communication with the power supply of a hard drive in said personal computer, which selector selects a threshold value based on the operating conditions of said hard drive, selecting a lower voltage for the threshold voltage when said power supply is providing power to said hard drive and selecting a higher voltage for the threshold voltage when said power supply is not providing power to said hard drive; a comparator in circuit communication with said selector and said battery, which comparator monitors the output voltage of said battery and compares the output voltage to the threshold voltage and generates an output signal when the output voltage is lower than the threshold voltage, said output signal opening said switch connecting said battery to said personal computer.

16. An over discharge protection circuit, comprising:

an electronic device;

at least one battery selectively powering said electronic device, having an output voltage, and having an associated output voltage signal related to the output voltage; and a control unit that monitors the output voltage signal, monitors a signal associated with an operating condition of said electronic device, and disconnects power from said battery to said electronic device when a predetermined condition occurs relative to the output voltage signal and the signal associated with the operating condition of said electronic device.

17. An over discharge protection circuit according to claim 16 wherein control unit selects a threshold signal from between at least two signals based on the signal associated with the operating condition of said electronic device, and disconnects power from said battery to said electronic device when the output signal meets a predetermined condition in comparison with the threshold signal.

18. An over discharge protection circuit according to claim 16 wherein said battery is a rechargeable NiCd battery.

19. An over discharge protection circuit according to claim 16 wherein said control unit further comprises:

a switch connecting said battery to said electronic device; and a comparator which compares the output voltage signal to said threshold signal and generates a response signal which opens said switch when the output voltage signal meets a predetermined condition in comparison with the threshold signal.

20. An over discharge protection circuit according to claim 16 wherein said control unit further comprises a selector which monitors a signal associated with an operating condition of said electronic device and selects a threshold signal from between at least two possible signals, said threshold signal being selected on the basis of a signal associated with the operating condition of said electronic device.

21. An over discharge protection circuit according to claim 20 wherein said selector is in circuit communication with at least one component of said electronic device.

22. An over discharge protection circuit according to claim 21 wherein said selector is in circuit communication with the power supply of said component and selects a threshold signal of lower magnitude when said power supply is actively supplying power and a threshold signal of higher magnitude when said power supply is not actively supplying power.

23. An over discharge protection circuit according to claim 22 wherein said component is a hard drive.

24. An over discharge protection circuit, comprising:

a personal computer including a hard drive powered by a power supply;

at least one rechargeable battery selectively powering said personal computer and having an output signal;

a switch connecting said battery to said personal computer;

a control unit comprising a selector in circuit communication with said power supply of said hard drive in said personal computer which selects a threshold signal of lower magnitude when said power supply is providing power to said hard drive and a threshold signal of higher magnitude when said power supply is not providing power to said hard drive, a comparator in circuit communication with said selector and said battery which monitors the output signal of said battery and compares the output signal to the threshold signal and generates a response signal when the magnitude of said output signal is lower than the magnitude of the threshold signal, said response signal opening said switch thereby disconnecting said battery from said electronic device.

* * * * *